March 1, 1932. W. F. NEUBECK 1,847,222
AIRPLANE
Filed March 26, 1930 2 Sheets-Sheet 1

William F. Neubeck INVENTOR
BY Maxwell E. Sparrow
ATTORNEY

March 1, 1932.  W. F. NEUBECK  1,847,222

AIRPLANE

Filed March 26, 1930 2 Sheets-Sheet 2

William F. Neubeck INVENTOR
BY
ATTORNEY

Patented Mar. 1, 1932

1,847,222

UNITED STATES PATENT OFFICE

WILLIAM F. NEUBECK, OF NEW YORK, N. Y.

AIRPLANE

Application filed March 26, 1930. Serial No. 439,016.

This invention relates to flying machines of the heavier-than-air type.

One of the objects of the invention is in the provision of a novel type of device whereby the airplane may ascend or descend safely within a comparatively small area, together with the load carried thereby.

A further feature is in the provision of an airplane in which rudders are mounted near the outer ends thereof and pivoted on their central vertical axes between the wings, the rudders preferably, operating independently of each other.

A further object is in the provision of an airplane having ailerons or hinged wing-tips disposed at the front and rear side edges of the wings whereby the airplane may be elevated and depressed by the positioning of the ailerons, the front ailerons facilitating immediate take-off and also by its manipulation stabilizing the machine on an even keel in the event the load carried by the machine shifts or is not equally distributed.

A further purpose is in the provision of an airplane having transverse wing-fins or abutments at the extremities of the ailerons in which the rudders and wing fins act as stabilizers, while the ailerons and fins conjunctively operate as a parachute if required.

Another object of the invention is to provide in an airplane a pusher propeller at one end and a puller propeller at the other end of the fuselage, both propellers operating simultaneously, and being propelled by separate motors.

Another object of the invention is to provide an airplane having a pair of propellers and wherein the center of gravity is midway between the propellers, thereby enabling the airplane to be propelled by one motor in the event the other motor ceases to function.

Still a further object is in the provision of an airplane in which the apex of the curve of the wings is located centrally thereof and within the plane of equilibrium of the airplane whereby the lifting power is in the center of the wings.

Still a further object is to provide in an airplane, rotatable stabilizing blades mounted on each upper wing thereof.

A still further object of the invention is to provide an airplane with propeller motors disposed within the fuselage, thereby cutting down wind resistance and facilitating repairs.

A still further object is to provide a tailess airplane.

These several objects are obtained by the novel and practical combination of parts hereinafter disclosed and shown in the accompanying drawings, constituting a part of this disclosure, and in which:—

Figure 1:
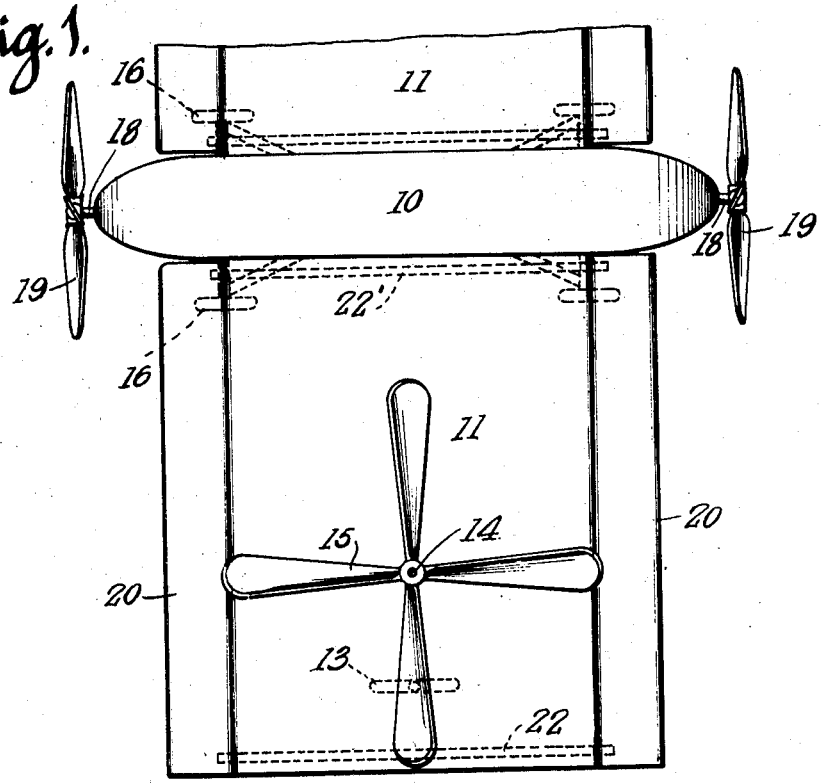
Figure 1 is a partial plan view of an airplane, made in accordance with the invention.
Figure 2:
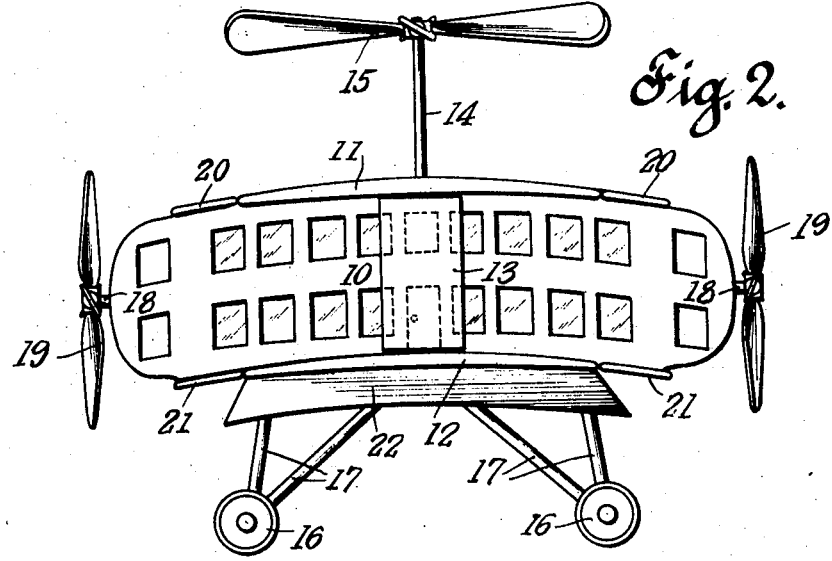
Figure 2 is a side elevational view of the same.
Figure 3:
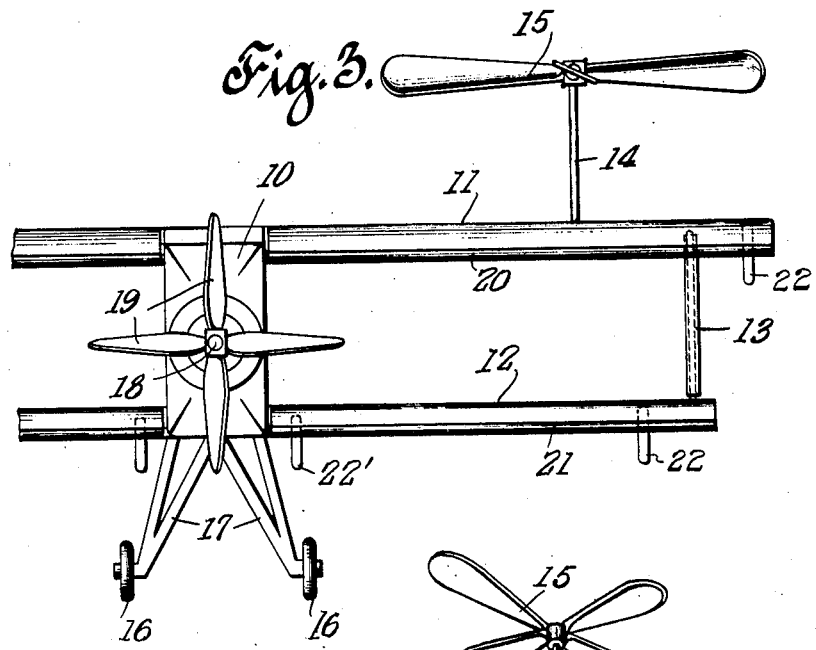
Figure 3 is a partial front view showing the upper and lower wings, fuselage, stabilizing blades and rudder elements, together with the landing devices.
Figure 4:
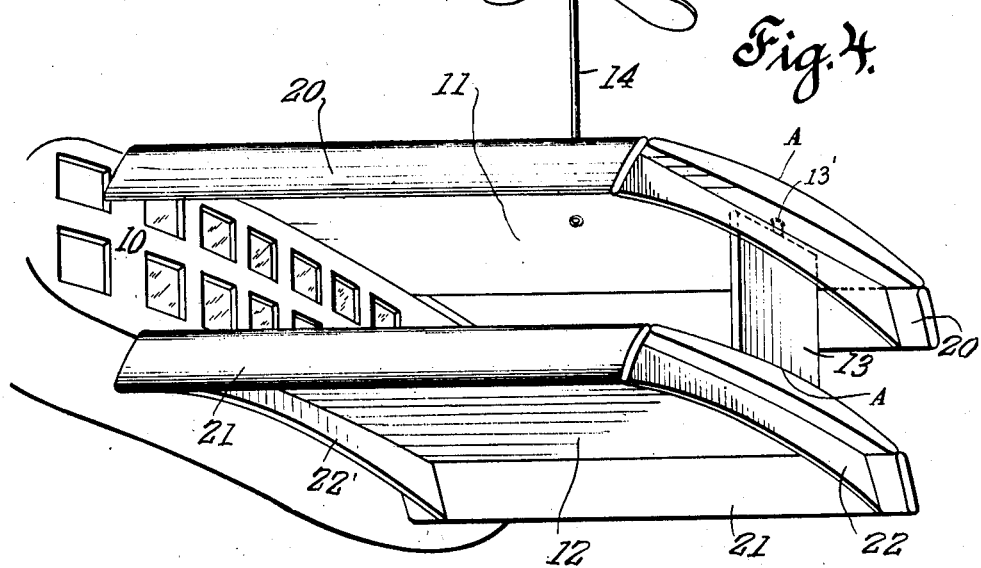
Figure 4 is a perspective view of the same in condition for landing.

Throughout the several views, the numeral 10 designates in general the main body or fuselage of the structure which, as will be seen, is preferably, provided with upper and lower wings, respectively 11 and 12, extending laterally outward to an equal extent from both sides of the fuselage and constituting in effect a biplane. The apex of the curve of the wings is located centrally thereof as shown at A.

Near the outer ends between the wings are rudders 13, pivoted along their respective central vertical axes on fixed struts or tie rods 13', the latter being adapted to hold the upper and lower wings in fixed relative position. The rudders 13 are independently operated in relation to each other by any suitable means.

Extending up from the upper wings are shafts 14 carrying rotatable stabilizing blades 15.

Below the fuselage and extending laterally outward near each end thereof are landing wheels 16 supported by strut brackets 17, while at the ends of the structure are outwardly extending shafts 18, driving propellers 19.

These propellers are of the usual type, and are driven by independent motors within the fuselage under the instant control of the operator, one propeller being adapted to "push" and the other to "pull", both propellers operating simultaneously.

By placing the motors in the fuselage, wind resistance is cut down when the airplane is in flight. Also thus locating the motors facilitates repairing the same.

Attached in the usual manner to the side edges of the upper wings 12 are ailerons 20 front and rear respectively, similar ailerons 21 being hingedly attached to the corresponding edges of the lower wings, as is clearly shown. These ailerons are operated by any suitable means whereby the airplane may be elevated or depressed.

Extending downwardly, below the lower wings 12, are fixed either rigidly or hingedly, thin abutments or fins 22 reaching transversely entirely across their under surfaces, and presenting outer end edges, against which the lower ailerons 21 may be closely folded by mechanism under the control of the operator, thereby providing a pocket-like parachute of which the wings constitute the upper or cover member. These parachutes are of such considerable area as to floatingly support the structure when so desired or in case of damage to the driving mechanism. The thin abutments 22 also act as stabilizing fins. Also when the rudders 13 are operated to turn the airplane, the rudders are in angular position with respect to the abutments and air or wind pockets are formed thereby thus enabling the airplane to make a turn more rapidly and positively.

The upper wings 11 may be provided with similar fins 22 for the same purpose.

The descent of the airplane is aided by the actions of the stabilizing blades 15.

It is to be observed that the rudders 13 and fins 22 perform dual functions. The plane will always maintain its equilibrium and even keel due to the stabilizing effect of fins 22 and position of the rudders 13.

Because my airplane is equally balanced throughout and because of the provisions therein of the front ailerons, rear propeller, and the absence of a tail, the airplane may be made to ascend safely from a comparatively small area; and by the inclusion of the elements producing a parachute effect, and the further inclusion of the stabilizing blades, the same may be made to descend within a comparatively small area.

Although the foregoing is briefly a description of the device in general, it will be understood that very considerable details have been omitted, all of which is regarded as unnecessary, being well known in the art to which the invention pertains.

It is further obvious that changes in the structure may be made without sacrificing the general spirit of the invention.

While I have shown and described a preferred form of embodiment of this invention I am well aware that other modifications may be made and I therefore desire a broad interpretation of the invention within the scope and spirit of the disclosure herein and the claims appended hereto.

Having thus described the invention, what is claimed as new and desired to obtain by Letters Patent, is:—

1. An airplane comprising a body having upper and lower wings rigidly engaged thereon and extending oppositely outward, each of said wings having a transversely curved upper surface, the apex of the curve being located centrally of the wing, rotatable stabilizing blades mounted on each of said upper wings, rudders pivoted at their central vertical axes, between the upper and lower wings near their outer extremities, pairs of spaced abutments extending below said wings, ailerons hingedly engaged with the opposed longitudinal edges of the wings, said ailerons being adapted to be folded closely against the edges of said abutments, and motor driven propellers arranged fore and aft on the said body.

2. An airplane comprising a body having upper and lower wings rigidly engaged thereon and extending oppositely outward, each of said wings having a transversely-curved upper surface, the apex of the curve being located centrally of the wings, rotatable stabilizing blades mounted on each of said upper wings, struts fixed between the upper and lower wings near their outer extremities to hold said wings in fixed relative position, rudders pivoted at their central vertical axes on said struts, pairs of spaced abutments extending below said wings, ailerons hingedly engaged with the opposed longitudinal edges of the wings, said ailerons being adapted to be folded closely against the edges of said abutments, and motor driven propellers arranged fore and aft on the said body.

3. An airplane comprising a body having wings rigidly engaged thereon and extending oppositely outward, said wings having transversely-curved upper surfaces, the apex of the curve being located centrally of the wings, rotatable stabilizing blades mounted on the wings, rudders pivoted at their central vertical axes near the outer extremities of the wings, pairs of spaced abutments extending below said wings, ailerons hingedly engaged with the opposed longitudinal edges of the wings, said ailerons being adapted to be folded closely against the edges of said abutments, and motor driven propellers arranged fore and aft on the said body.

4. An airplane comprising a body having wings rigidly engaged thereon and extending oppositely outward, said wings having transversely-curved upper surfaces, the apex of the curve being located centrally of the wings, rudders pivoted at their central vertical axes near the outer extremities of the wings, pairs of spaced abutments extending below said wings, ailerons hingedly engaged with the opposed longitudinal edges of the wings, said ailerons being adapted to be folded closely against the edges of said abutments, and motor driven propellers arranged fore and aft on the said body.

5. An airplane comprising a body having wings rigidly engaged thereon and extending oppositely outward, said wings having transversely-curved upper surfaces, the apex of the curve being located centrally of the wings, rudders pivoted at their central vertical axes near the outer extremities of the wings, pairs of spaced abutments extending below said wings, ailerons hingedly engaged with the opposed longitudinal edges of the wings, said ailerons being adapted to be folded closely against the edges of said abutments.

6. An airplane comprising a body having wings rigidly engaged thereon and extending oppositely outward, said wings having transversely-curved upper surfaces, the apex of the curve being located centrally of the wings, rudders pivoted on said wings, pairs of spaced abutments extending below said wings, ailerons engaged with the opposed longitudinal edges of the wings, said ailerons being adapted to be folded closely against the edges of said abutments, motor driven propeller means.

7. In an airplane having spaced upper and lower wings, a fuselage on which said wings are rigidly attached, rudders pivoted between said wings near their outer extremities, propellers operable independently at each end of said fuselage, stabilizing blades extending above the upper wings, and means for metamorphosing the wings into parachutes.

8. In an airplane, a body, wings extending outwardly from the opposite sides thereof, rotatable rudders mounted on a vertical axis on the wings, and transverse abutments on the wings for cooperation with the rotatable rudders when the latter are in an angular position with respect to said abutments to form an air-pocket as and for the purpose described.

9. In an airplane, a body, wings extending outwardly from the opposite sides thereof, rudders rotatably mounted on said wings near the outer ends thereof, propellers operable independently at each end of the body, stabilizing blades extending above the wings, and means for metamorphosing the wings into parachutes.

10. In an airplane, a body, upper and lower wings extending outwardly from the opposite sides thereof, rotatable rudders mounted on a vertical axis between the upper and lower wings adjacent the outer ends thereof, and abutments arranged transversely on the under side of the wings outwardly of the rudders and co-operating with the rudders when the latter are in an angular position with respect to the respective abutments to form air pockets as and for the purpose described.

11. A tailless airplane comprising a body having motor driven propellers at each end, wings engaging the body and extending oppositely outward therefrom, said wings having transversely curved upper surfaces, with the apex of the curve lying in its center, the center of gravity of the airplane lying on a line produced by the intersection of a plane through the transverse center of the wings from tip to tip and a plane perpendicularly thereto and passing through the center of the body.

12. A tailless airplane comprising a body having motor driven propellers at each end, wings, engaging the body and extending oppositely outward therefrom, said wings having transversely curved upper surfaces with the apex of the curve lying in its center, the center of gravity of the airplane lying on a line produced by the intersection of a plane through the transverse center of the wings from tip to tip and a plane perpendicularly thereto and passing midway between the propellers.

Signed at New York, in the county and State of New York, this 20th day of March, 1930.

WILLIAM F. NEUBECK.